United States Patent
Prakash et al.

(10) Patent No.: US 11,323,189 B2
(45) Date of Patent: *May 3, 2022

(54) PROXIMATE COMMUNICATION WITH A TARGET DEVICE

(71) Applicant: Intel Corporation, Santa Clara, CA (US)

(72) Inventors: Gyan Prakash, Beaverton, OR (US); Nagasubramanian Gurumoorthy, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/204,178

(22) Filed: Mar. 17, 2021

(65) Prior Publication Data

US 2021/0376939 A1     Dec. 2, 2021

Related U.S. Application Data

(63) Continuation of application No. 16/723,153, filed on Dec. 20, 2019, now Pat. No. 10,972,194, which is a
(Continued)

(51) Int. Cl.
*H04B 5/00* (2006.01)
*H04W 4/80* (2018.01)
(Continued)

(52) U.S. Cl.
CPC ........... *H04B 17/20* (2015.01); *H04B 5/0031* (2013.01); *H04B 5/0062* (2013.01); *H04W 4/80* (2018.02)

(58) Field of Classification Search
CPC .. H04B 5/0025; H04B 5/0031; H04B 5/0062; H04B 7/24; H04B 7/26; H04B 17/20; H04W 4/00; H04W 4/08; H04W 4/80; H04M 1/72; H04M 1/72403; H04M 1/72406; H04M 1/72412; H04L 63/08;
(Continued)

(56) References Cited

U.S. PATENT DOCUMENTS 6,885,862 B1   4/2005  Pearson
7,107,610 B2   9/2006  Lortz
(Continued)

FOREIGN PATENT DOCUMENTS

EP         2832007 A1    2/2015
WO    WO-2013147910 A1   10/2013

OTHER PUBLICATIONS

"U.S. Appl. No. 13/977,130, Notice of Allowance dated Apr. 27, 2015", 10 pgs.
(Continued)

*Primary Examiner* — Quochien B Vuong
(74) *Attorney, Agent, or Firm* — Schwegman Lundberg & Woessner, P.A.

(57) ABSTRACT

Systems and methods may use proximate communication to retrieve information pertaining to a target device. In one example, the method may include detecting the target device within a vicinity of a user device, receiving an information request response communication including information pertaining to the target device, and receiving an operation request response communication including information pertaining to a performed operation.

28 Claims, 2 Drawing Sheets

Related U.S. Application Data continuation of application No. 16/058,124, filed on Aug. 8, 2018, now Pat. No. 10,516,493, which is a continuation of application No. 15/494,653, filed on Apr. 24, 2017, now Pat. No. 10,069,579, which is a continuation of application No. 14/991,668, filed on Jan. 8, 2016, now Pat. No. 9,686,025, which is a continuation of application No. 14/819,930, filed on Aug. 6, 2015, now Pat. No. 9,667,360, which is a continuation of application No. 13/977,130, filed as application No. PCT/US2012/031755 on Mar. 31, 2012, now Pat. No. 9,125,006.

(51) Int. Cl.
  *H04B 7/00* (2006.01)
  *H04B 17/20* (2015.01)

(58) Field of Classification Search
  CPC ......... H04L 67/16; H04L 67/32; H04L 67/34; H04L 67/125; H04L 67/303
  See application file for complete search history.

(56) References Cited

U.S. PATENT DOCUMENTS

| | | | |
|---|---|---|---|
| 7,543,745 B1 | 6/2009 | Simske et al. | |
| 7,779,263 B2 | 8/2010 | Kanai | |
| 7,936,706 B2 | 5/2011 | Wood, Jr. | |
| 7,949,358 B2 * | 5/2011 | Wentink | H04W 48/14 455/515 |
| 8,170,481 B2 * | 5/2012 | Rangarajan | H04L 67/16 455/41.2 |
| 8,594,632 B1 * | 11/2013 | Azizi | H04W 8/005 455/411 |
| 9,013,278 B2 | 4/2015 | Goossens et al. | |
| 9,076,006 B1 | 7/2015 | Saylor et al. | |
| 9,125,006 B2 | 9/2015 | Prakash et al. | |
| 9,432,833 B2 * | 8/2016 | Kim | H04W 48/16 |
| 9,578,126 B1 | 2/2017 | Kirti et al. | |
| 9,667,360 B2 | 5/2017 | Prakash et al. | |
| 9,686,025 B2 | 6/2017 | Prakash et al. | |
| 9,888,039 B2 | 2/2018 | Elliot et al. | |
| 10,069,579 B2 | 9/2018 | Prakash et al. | |
| 10,516,493 B2 | 12/2019 | Prakash et al. | |
| 10,972,194 B2 | 4/2021 | Prakash et al. | |
| 2002/0045454 A1 | 4/2002 | Iwata | |
| 2005/0022181 A1 | 10/2005 | Hasbun | |
| 2006/0112171 A1 | 5/2006 | Rader | |
| 2008/0204199 A1 | 8/2008 | Howarth et al. | |
| 2009/0251319 A1 | 10/2009 | Ichikawa et al. | |
| 2011/0084807 A1 | 4/2011 | Logan et al. | |
| 2011/0248852 A1 | 10/2011 | Falk et al. | |
| 2012/0038465 A1 | 2/2012 | Goossens et al. | |
| 2015/0024680 A1 | 1/2015 | Prakash et al. | |
| 2015/0089222 A1 | 3/2015 | White et al. | |
| 2016/0080037 A1 | 3/2016 | Prakash et al. | |
| 2016/0127054 A1 | 5/2016 | Prakash et al. | |
| 2017/0373769 A1 | 12/2017 | Prakash et al. | |
| 2019/0215083 A1 | 7/2019 | Prakash et al. | |
| 2020/0244378 A1 | 7/2020 | Prakash et al. | |

OTHER PUBLICATIONS

"U.S. Appl. No. 13/977,130, Preliminary Amendment filed Jun. 28, 2013", 8 pgs.
"U.S. Appl. No. 14/819,930, Final Office Action dated Jul. 26, 2016", 12 pgs.
"U.S. Appl. No. 14/819,930, Non Final Office Action dated Mar. 22, 2016", 21 pgs.
"U.S. Appl. No. 14/819,930, Notice of Allowance dated Jan. 25, 2017", 5 pgs.
"U.S. Appl. No. 14/819,930, Preliminary Amendment filed Dec. 28, 2015", 9 pgs.
"U.S. Appl. No. 14/819,930, Response filed Jun. 22, 2016 to Non Final Office Action dated Mar. 22, 2016", 16 pgs.
"U.S. Appl. No. 14/991,668, Final Office Action dated Nov. 18, 2016", 15 pgs.
"U.S. Appl. No. 14/991,668, Non Final Office Action dated Aug. 8, 2016", 21 pgs.
"U.S. Appl. No. 14/991,668, Notice of Allowance dated Feb. 16, 2017", 5 pgs.
"U.S. Appl. No. 14/991,668, Response filed Oct. 27, 2016 to Non Final Office Action dated Aug. 8, 2016", 15 pgs.
"U.S. Appl. No. 15/494,653, Non Final Office Action dated Feb. 9, 2018", 11 pgs.
"U.S. Appl. No. 15/494,653, Notice of Allowance dated May 21, 2018", 8 pgs.
"U.S. Appl. No. 15/494,653, Preliminary Amendment filed Sep. 18, 2017", 6 pgs.
"U.S. Appl. No. 15/494,653, Response filed Mar. 28, 2018 to Non Final Office Action dated Feb. 9, 2018", 10 pgs.
"U.S. Appl. No. 16/058,124, Non Final Office Action dated May 9, 2019", 18 pgs.
"U.S. Appl. No. 16/058,124, Response filed Aug. 6, 2019 to Non-Final Office Action dated May 9, 2019", 8 pgs.
"U.S. Appl. No. 16/058,124, Preliminary Amendment filed Apr. 30, 2019", 6 pgs.
"U.S. Appl. No. 16/723,153, Non Final Office Action dated Jun. 30, 2020", 22 pgs.
"U.S. Appl. No. 16/723,153, Notice of Allowance dated Dec. 2, 2020", 7 pgs.
"U.S. Appl. No. 16/723,153, Preliminary Amendment filed Apr. 17, 2020", 8 pgs.
"U.S. Appl. No. 16/723,153, Response filed Sep. 29, 20 to Non Final Office Action dated Jun. 30, 2020", 9 pgs.
"Canadian Application Serial No. 16/058,124, Notice of Allowance dated Aug. 19, 2019", 8 pgs.
"European Application Serial No. 12872789, Partial Supplementary European Search Report dated Nov. 26, 2015", 2 pgs.
"European Application Serial No. 12872789.8, Communication Pursuant to Article 94(3) EPC mailed Mar. 20, 2019", 6 pgs.
"European Application Serial No. 12872789.8, Communication Pursuant to Article 94(3) EPC mailed Apr. 30, 2018", 4 pgs.
"European Application Serial No. 12872789.8, Extended European Search Report dated Dec. 3, 2015", 7 pgs.
"European Application Serial No. 12872789.8, Response filed Jul. 1, 2016 to Extended European Search Report dated Dec. 3, 2015", 10 pgs.
"European Application Serial No. 12872789.8, Response filed Sep. 10, 2018 to Communication Pursuant to Article 94(3) EPC mailed Apr. 30, 2018", 9 pgs.
"European Application Serial No. 12872789.8, Response filed Sep. 30, 2019 to Communication Pursuant to Article 94(3) EPC mailed Mar. 20, 2019", 9 pgs.
"International Application Serial No. PCT/US2012/031755, International Preliminary Report on Patentability dated Oct. 9, 2014", 6 pgs.
"International Application Serial No. PCT/US2012/031755, International Search Report dated Jul. 24, 2012", 3 pgs.
"International Application Serial No. PCT/US2012/031755, Written Opinion dated Jul. 24, 2012", 4 pgs.
Carlos, Batista, "Retail 2.0 & IBEACONS: Wooing Your Customer Within The Brick and Mortar Space", Blog Post, [Online] Retrieved from the internet:<http://www.olsoncanada.com>, (Dec. 2, 2015), 10 pgs.
Nintendo, "Wherever you are, StreetPass is ready", [Online] Retrieved from the internet: <http://www.nintendo.com/3ds/built-in-software/streetpass/how-it-works, Nintendo>, (Dec. 2, 2015), 3 pgs.
"European Application Serial No. 20187932.7, Extended European Search Report dated Sep. 29, 2020", 8 pgs.

(56) References Cited

OTHER PUBLICATIONS

"European Application Serial No. 20187932.7, Response filed Jul. 5, 2021 to Extended European Search Report dated Sep. 29, 2020", 16 pgs.

* cited by examiner

PROXIMATE COMMUNICATION WITH A TARGET DEVICE

CROSS-REFERENCE TO RELATED APPLICATIONS

The present application is a continuation of U.S. patent application Ser. No. 16/723,153, filed Dec. 20, 2019, which is a continuation of U.S. patent application Ser. No. 16/058, 124, filed Aug. 8, 2018, which is a continuation of U.S. patent application Ser. No. 15/494,653, filed Apr. 24, 2017, which is a continuation of U.S. patent application Ser. No. 14/991,668, filed Jan. 8, 2016, now U.S. Pat. No. 9,686,025 issued Jun. 20, 2017, which is a continuation of U.S. patent application Ser. No. 14/819,930 filed Aug. 6, 2015, now U.S. Pat. No. 9,667,360 issued May 30, 2017, which is a continuation of U.S. patent application Ser. No. 13/977,130 filed Sep. 16, 2014, now U.S. Pat. No. 9,125,006 issued Sep. 1, 2015, which is the National Stage of International Application No. PCT/US2012/031755, filed Mar. 31, 2012, and all of which are incorporated herein by reference.

BACKGROUND

Technical Field

Embodiments generally relate to proximate communication with a target device. More particularly, embodiments relate to utilizing proximate communication to retrieve information pertaining to a target device.

Discussion

A challenge with purchasing or using unfamiliar devices may be a user's inability to access necessary information pertaining to the device. For example, when considering a purchase of a new device, a user may need to open its packaging to determine whether the device works properly.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
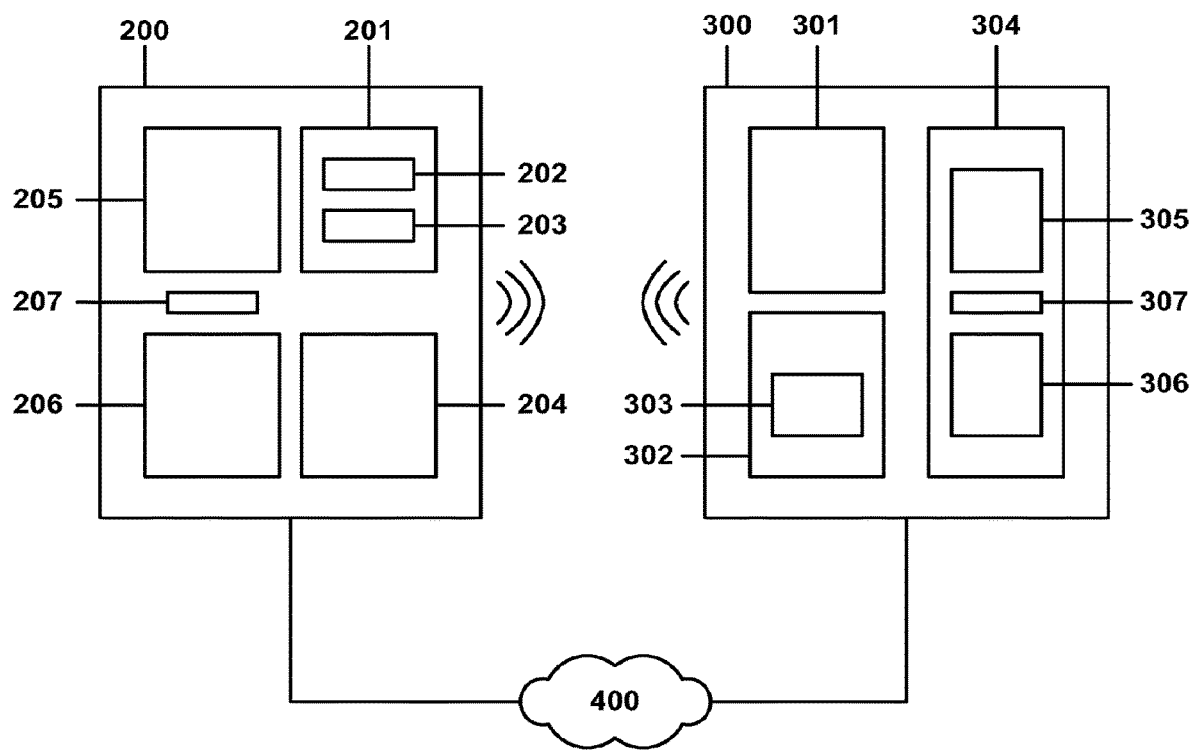
FIG. 1 is a block diagram of an example of a computing system for implementing proximate communication to retrieve information pertaining to a target device in accordance with an embodiment of the invention.

Turning now to FIG. 1, a block diagram of a computing system 100 that utilizes proximate communication to retrieve information pertaining to a target device is shown. The computing system 100 may include a user device 200 and a target device 300. The user device 200 and the target device 300 may be coupled to a network 400, such as the Internet.

The user device 200 may be any device capable of communicating with a target device. For example, the user device 200 may be, among other things, a mobile device (e.g., a mobile/smart phone, a personal digital assistant, a smart tablet device), a notebook computer, or a desktop computer. In this example, the user device 200 is a smart phone. The user device 200 may include, for example, a user device memory 201, a user device processing component 204, a user device transceiver 205, a user device interface 206, and a user device power source 207.

The user device memory 201 may be any memory device that may be used to store data. The user device memory 201 may include a target device interface application 202 and a target device configuration application 203.

The target device interface application 202 may be utilized to interface with the target device 300. For example, as will be discussed in greater detail, the target device interface application 202 may be configured to generate a detection communication to detect the presence of the user device 300 and generate an identity inquiry communication requesting information pertaining to the identity of a target device (e.g., make information, model information, etc.). In addition, the target device interface application 202 may also be configured to generate an information request communication in order to request information (e.g., technical specifications, user manuals, assembly instructions, care instructions, etc.) pertaining to the target device 300, and generate an operation request communication pertaining to an operation be performed on or by the target device 300.

The target device configuration application 203 may be utilized to, among other things, configure various aspects of the target device 300 according to the user's preferences. For example, the target device configuration application 203 may be utilized to, among other things, configure preferences, options, or features. These preferences, options, or features (or the like) may pertain to, among other things, target device operation (e.g., establishing a remote connection) or target device security (e.g., establishing a password or PIN/personal identification number).

The user device processing component 204 may include at least one computer processor configured execute computer-readable executable instructions. For example, the user device processing component 204 may execute software applications, such the target device interface application 202 and the target device configuration application 203.

The user device transceiver 205 may be a transmitter/receiver that enables the user device 200 to wirelessly communicate with other devices (e.g., target device 300). The user device transceiver may be active (i.e., coupled to a power source) or passive (i.e., not coupled to a power source). In this embodiment, the user device 200 and the target device 300 may communicate wirelessly via Radio-frequency identification (RFID) protocol, wherein the user device transceiver 205 may be an active transceiver coupled to the user device power source 207. In this embodiment, the user device power source 207 may be an on-board battery.

In other embodiments of the present invention, communication may take place via near field communication protocol, a wireless data connection (e.g., IEEE 802.11, 1999 Edition, LAN/MAN Wireless LANS (WiFi), IEEE 802.16-2004, LAN/MAN Broadband Wireless LANS (WiMAX), Bluetooth (e.g., IEEE 802.15.1-2005, Wireless Personal Area Networks), Zigbee (IEEE 802.15.4), etc.), a cellular telephone connection (e.g., W-CDMA (UMTS), CDMA2000 (IS-856/IS-2000), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances.

The user device 200 may also include the user device interface 206, which may allow a user to interact with the user device 200. In this embodiment, the user device interface 206 may be a smart phone display screen displaying a graphical user interface (GUI).

Turning now to the target device 300, the target device 300 may include any device configured to communicate with the user device 200. For example, the target device 300 may be a mobile smart phone, a flat screen television, a notebook computer, a digital camera, an appliance, a smart tablet, or any other device about which one may wish to gain additional information. In this embodiment, the target device 300 is a flat screen television. The target device 300 may include, for example, a target device transceiver 301, a target device response component 302, and a target device memory 304.

Similar to the user device transceiver 203, the target device transceiver 301 may enable the target device 300 to communicate via various communication protocols with other devices, such as the user device 200. In this example, the target device transceiver 301 may be a passive device utilizing RFID. That is, the target device 300 may not need to be powered on by an external power source in order to communicate with the user device 200.

The target device response component 302 may include an electronic component configured to, among other things, generate a response to a communication from the user device 200. In this embodiment, the target device response component 302 may include a microcontroller 303 that has a firmware component. In other embodiments, the target device response component 302 may include an application, a processing component, an application-specific integrated circuit, a logic array, a field programmable gate array, or the like.

The target device memory 304 may be a memory device that may be used to store data. For example, the target device memory 304 may store a first target device information item 305, a second target device information item 306, and a target device query application 307.

Examples of the target device information items 305, 306 may include make information, model information, user manuals, assembly instructions, care instructions, technical specifications, or the like. In this embodiment, the first target device information item 305 may be the make and model information of the target device, and the second target device information item 306 may be a technical specification document.

The target device query application 307 may be executed (e.g., by the target device response component 302) to generate information pertaining to the target device 300. Examples of the target device query application 307 include a power-on self test (POST), a built-in self test (BIST), a dead-pixel test, or any other application or routine that may be executed to generate information pertaining to the target device 300. In this embodiment, the target device query application 307 is a POST routine.

Accordingly, as will be discussed in greater detail, in response to receiving a detection communication from the user device 200, the target device transceiver 301 may (passively) originate a detection response communication to indicate the presence of the target device 300.

Also, in response to an identity inquiry communication from the user device 200, the target device response component 302 may access the first target device information item 305, and generate an identity inquiry response communication (to identify the target device 300) for transmission to the user device 200. The identity inquiry response communication may include the make and model information (i.e., from the target device information item 305).

Similarly, upon receipt of an information request communication from the user device 200 requesting a technical specification of the target device 300, the target device response component 302 may access the second target device information item 306, and generate an information request response communication, including the technical specification document, for transmission to the user device 200.

In addition, upon receipt of an operation request communication from the user device 200 requesting that an operation be performed on or by the target device 300, the target device response component 305 may generate an operation request response communication including information pertaining to the operation to be performed on the target device. For example, in response to an operation request communication from the user device 200, the target device response component 305 may access the target device query application 307, execute the POST, and generate an operation request response communication including the results of the POST for transmission to the user device 200.

The arrangement and numbering of blocks depicted in FIG. 1 is not intended to imply an order of operations to the exclusion of other possibilities. Those of skill in the art will appreciate that the foregoing systems and methods are susceptible of various modifications and alterations.

For example, in the embodiment illustrated in FIG. 1, the user device memory 201 includes the target device interface application 202 and the target device configuration application 203. However, in other embodiments, the target device interface application 202 may include the functionalities of the target device configuration application 203, and a separate target device configuration application may not present at all.

Figure 2:
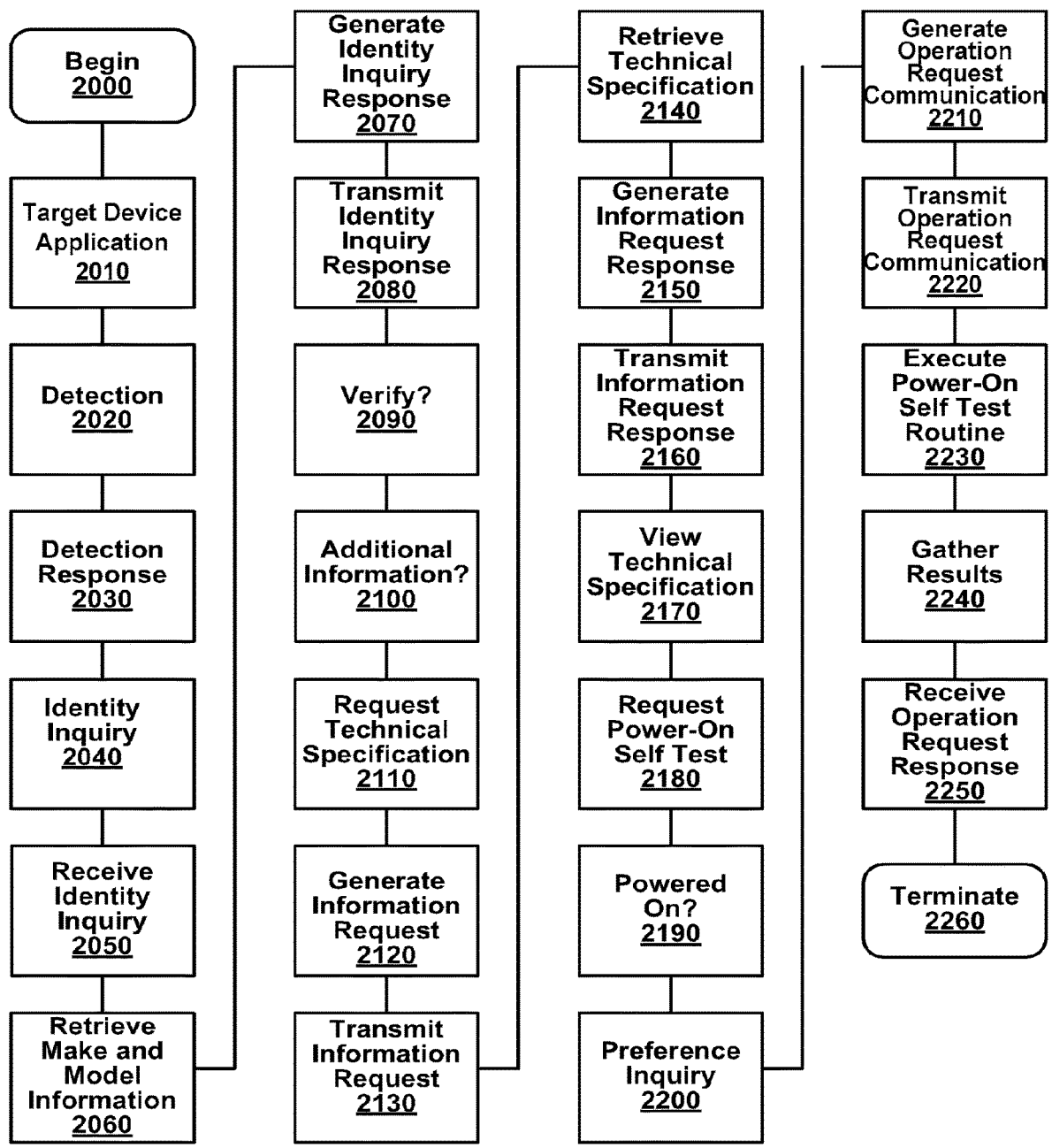
FIG. 2 is a flowchart of an example of a method of implementing proximate communication to retrieve information pertaining to a target device in accordance with an embodiment of the invention.

Turning now to FIG. 2, a flowchart of an exemplary method of proximate communication to exchange information pertaining to a target device according to one embodiment of the present invention is shown. The method might be implemented as a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method may be written in any combination of one or more programming languages, including an object oriented programming language such as Java, Smalltalk, C++ or the like and conventional procedural programming languages, such as the "C" programming language or similar programming languages.

In this example, a user may encounter a flat screen television of interest, such as the target device 300 (FIG. 1), at a retail store. The user may utilize a smart phone, such as user device 200 (FIG. 1), to communicate wirelessly with the target device via RFID.

The method begins at processing block 2000. At processing block 2010, a user may download and open/invoke a target device interface application, such as the target device interface application 202 (FIG. 1). At processing block 2020, the target device interface application may transmit, using a user device transceiver, such as the user device transceiver 205 (FIG. 1), a detection communication to detect the presence of the target device. At processing block 2030, a target device transceiver, such as the target device transceiver 301 (FIG. 1), may receive the signal, and transmit a detection response communication to indicate the presence of the flat screen television.

At processing block 2040, upon receiving the detection response communication from the target device, the target device interface application may generate an identity inquiry communication requesting information pertaining to the identity of a target device (e.g., make and model information) for transmission to the target device.

At processing block 2050, the target device transceiver may receive the identity inquiry communication. At processing block 2060, a target device response component, such as the target device response component 302 (FIG. 1), may access a target device memory, such as the target device memory 304 (FIG. 1), to retrieve the target device make and model information, such as the first target device information item 305 (FIG. 1). At processing block 2070, the target device response component may generate an identity inquiry response communication including the target device's make and model information for transmission to the user device. At processing block 2080, the target device transceiver may transmit the identity inquiry response communication to the user device.

At processing block 2090, upon receiving the identity inquiry response communication, the target device interface application may generate a display message for display on the user device interface, such as the user device interface 206 (FIG. 1). The message may ask the user to verify that the identified flat screen television is indeed the target device of interest to the user.

At processing block 2100, after receiving verification from the user, the target device interface application may generate a display message inquiring whether the user may want additional information pertaining to the target device. At processing block 2110, the user may request a technical specification. At processing block 2120, the target device interface application may generate an information request communication requesting the technical specification from the target device. At processing block 2130, the user device may transmit the information request communication.

At processing block 2140, upon receiving the information request communication, the target device response component may access the target device memory to retrieve a technical specification, such as the second target device information item 306 (FIG. 1). At processing block 2150, the target device response component may generate an information request response communication including the technical specification for transmission to the user device. At processing block 2160, the target device may transmit the information request response communication to the user device. At processing block 2170, the user device may receive the information request response communication, and the user may view the technical specification document on the user device interface.

At processing block 2180, the user may request, through the target device interface application, that the target device run a power-on self test (POST). In response, at processing block 2190, the target device interface application may generate a message to the user inquiring whether the flat screen television is powered on. At processing block 2200, after the flat screen television has been powered on, the target device interface application may make a preference inquiry regarding the user's preferences (e.g., content, format) regarding the returned results from the POST. At processing block 2210, upon receiving the user's preferences, the target device interface application may generate an operation request communication, including the user's preferences, to request that a POST be run on the target device. At processing block 2220, the user device may transmit the operation request communication to the target device.

At processing block 2230, upon receiving the operation request communication, the target device response component may access the target device memory to retrieve a POST routine, such as the target device query application 307 (FIG. 1), and execute it. At processing block 2240, the target device response component may gather results from the executed POST, and generate an operation request response communication that includes the results of the test according to the user's preferences. At processing block 2250, the user device may receive the operation request response communication, and the user may view the results of the POST on the user device interface. At processing block 2260, the process may terminate.

The sequence and numbering of processing blocks depicted in FIG. 2 is not intended to imply an order of operations to the exclusion of other possibilities. Those of skill in the art will appreciate that the foregoing systems and methods are susceptible of various modifications and alterations.

For example, in the embodiment described above, after receiving the operation request response communication at the user device, the user views the results (i.e., processing block 2250), and the process terminates (i.e., processing block 2260). However, in other embodiments, a target device interface application may be configured to receive and respond to any question. So, for example, upon receiving a communication from the target device (e.g., an operation request response communication, etc.), a user may have a question regarding the meaning of a particular term used in the results of a POST. In this case, the target device interface application may communicate with the target device, a coupled device, or a network, such as the Internet 400 (FIG. 1), to retrieve an answer to the user's question.

Alternatively, for example, upon receiving a target device information item, such as a technical specification, the user may inquire whether the retrieved version is the latest version. In response, the target device interface application may be configured to communicate with any coupled device to determine whether the retrieved version is the latest.

Embodiments may therefore involve a method of proximate communication to retrieve information pertaining to a target device, comprising detecting a presence of the target device in a vicinity of a user device, transmitting an identity inquiry communication to the target device, and receiving an identity inquiry response communication identifying the target device. The method may also provide for transmitting an information request communication including a request for information pertaining to the target device and receiving an information request response communication including a response to the request for information pertaining to the target device. In addition, the method may also provide for transmitting an operation request communication pertaining to an operation to be performed on the target device and receiving an operation request response communication including information pertaining to the operation to be performed on the target device.

In one example, the method may include invoking a target device interface application stored in a memory of the user device.

In another example, the target device interface application generates one or more of the identity inquiry communication, the information request communication, and the operation request communication.

In another example, the method may also provide a preference inquiry pertaining to the information pertaining to the operation to be performed on the target device.

In still another example, the method may include transmitting a detection communication to detect the presence of the target device.

In another example, the target device and the user device utilize radio-frequency identification (RFID).

In another example, the target device and the user device utilize near-field communication.

In yet another example, the operation request communication includes a user response to a preference inquiry.

Embodiments may also include at least one machine readable medium comprising a plurality of instructions that in response to being executed on a computing device, cause the computing device to carry out any of the examples of the aforementioned method, an apparatus for proximate communication to retrieve information pertaining to a target device, comprising a transceiver and logic configured to perform any of the examples of the aforementioned method, and a system for implementing proximate communication to retrieve information pertaining to a target device comprising a user interface, a transceiver, and logic configured to perform any of the examples of the aforementioned method.

Embodiments may therefore involve a method of proximate communication using a target device to retrieve information pertaining to the target device, comprising receiving a detection communication from a user device, transmitting a detection response communication to indicate presence of the target device, and receiving an identity inquiry communication from a user device. The method may also provide for transmitting an identity inquiry response communication to identify the target device, receiving an information request communication including a request for information pertaining to the target device from the user device, and transmitting an information request response communication including a response to the request for information pertaining to the target device. In addition, the method may also provide for receiving an operation request communication pertaining to an operation to be performed on the target device from the user device, and transmitting an operation request response communication including information pertaining to the operation to be performed on the target device.

In another example, the method may include invoking a target device response component included in the target device.

In another example, the target device response component includes one or more of a processing component, an application-specific integrated circuit, a logic array, a field-programmable gate array, or a microcontroller.

In still another example, the target device response component generates one or more of the identity inquiry response communication, the information request response communication, and the operation request response communication.

In yet another example, the method may include accessing one or more of a target device information item and a target device query application stored on a target device memory of the target device.

In another example, the target device information item is one or more of make information, model information, a technical specification, a user manual, assembly instructions, and care instructions.

In another example, the target device query application is one or more of a power-on self test, a built-in self test, and a dead pixel test.

In another example, the target device and the user device utilize radio-frequency identification (RFID).

In still another example, the target device and the user device utilize near-field communication.

Embodiments may also include at least one machine readable medium comprising a plurality of instructions that in response to being executed on a computing device, cause the computing device to carry out any of the examples of the aforementioned method, an apparatus for proximate communication to retrieve information pertaining to a target device, comprising a transceiver and logic configured to perform any of the examples of the aforementioned method, and a system for implementing proximate communication to retrieve information pertaining to a target device comprising a user interface, a transceiver, and logic configured to perform any of the examples of the aforementioned method.

In addition, embodiments may also include a method of proximate communication to retrieve information pertaining to a target device, comprising transmitting an identity inquiry communication to the target device, transmitting an information request communication including a request for information pertaining to the target device, and transmitting an operation request communication pertaining to an operation to be performed on the target device.

In another example, a target device interface application generates one or more of the identity inquiry communication, the information request communication, and the operation request communication.

In another example, the method may include providing a preference inquiry pertaining the information pertaining to the performed operation.

In another example, the method may provide for transmitting a detection communication to detect the presence of the target device.

In still another example, the user device utilizes radio-frequency identification (RFID).

In yet another example, the user device utilizes near-field communication.

Embodiments may also include at least one machine readable medium comprising a plurality of instructions that in response to being executed on a computing device, cause the computing device to carry out any of the examples of the aforementioned method, an apparatus for proximate communication to retrieve information pertaining to a target device, comprising a transceiver and logic configured to perform any of the examples of the aforementioned method, and a system for implementing proximate communication to retrieve information pertaining to a target device comprising a user interface, a transceiver, and logic configured to perform any of the examples of the aforementioned method.

Embodiments may also include a method of proximate communication to retrieve information pertaining to a target device, comprising transmitting a detection response communication to indicate presence of the target device and transmitting an identity inquiry response communication to identify the target device. The method may also provide for transmitting an information request response communication including a response to the request for information pertaining to the target device, and transmitting an operation request response communication including information pertaining to the operation to be performed on the target device.

In another example, the target device includes a target device response component, and wherein the target device response component generates one or more of the identity inquiry response communication, the information request response communication, and the operation request response communication.

In another example, the target device includes a target device memory, wherein the target device memory includes one or more of a target device information item and a target device query application.

In still another example, the target device utilizes radio-frequency identification (RFID).

In yet another example, the target device utilizes near-field communication.

In another example, the target device information item is one or more of make information, model information, a technical specification, a user manual, assembly instructions, and care instructions.

Embodiments may also include at least one machine readable medium comprising a plurality of instructions that in response to being executed on a computing device, cause the computing device to carry out any of the examples of the aforementioned method, an apparatus for proximate communication to retrieve information pertaining to a target device, comprising a transceiver and logic configured to perform any of the examples of the aforementioned method, and a system for implementing proximate communication to retrieve information pertaining to a target device comprising a user interface, a transceiver, and logic configured to perform any of the examples of the aforementioned method.

Embodiments may therefore provide an apparatus comprising a processing component, a transceiver, and an identity inquiry module to transmit an identity inquiry communication to the target device. The apparatus may also include an information request module to transmit an information request communication including a request for information pertaining to the target device and an operation request module to transmit an operation request communication pertaining to an operation to be performed on the target device.

Another embodiment may provide an apparatus, comprising a transceiver, a memory component including one or more of a target device information item and a target device query application, and a detection response module to transmit a detection response communication to indicate presence of the target device. The apparatus may also provide an inquiry response module to transmit an identity inquiry response communication to identify the target device, a request response module to transmit an information request response communication including a response to the request for information pertaining to the target device, and a operation response module to transmit an operation request response communication including information pertaining to the operation to be performed on the target device.

Still another embodiment may provide a system comprising a user device including a processing component, a transceiver, a memory component, and an identity inquiry module to transmit an identity inquiry communication to the target device. The user device may also include an information request module to transmit an information request communication including a request for information pertaining to the target device and an operation request module to transmit an operation request communication pertaining to an operation to be performed on the target device. The system may also include a target device including a transceiver, a memory component including one or more of a target device information item and a target device query application, and a detection response module to transmit a detection response communication to indicate presence of the target device. The target device may also provide an inquiry response module to transmit an identity inquiry response communication to identify the target device, a request response module to transmit an information request response communication including a response to the request for information pertaining to the target device, and a operation response module to transmit an operation request response communication including information pertaining to the operation to be performed on the target device.

It will be evident to persons having the benefit of this disclosure that various modifications and changes may be made to these embodiments without departing from the broader spirit and scope of the embodiments described herein. The specification and drawings are, accordingly, to be regarded in an illustrative rather than a restrictive sense.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner Rather, such added detail may be used in connection with one or more exemplary embodiments to facilitate easier understanding. Any represented signal lines, whether or not having additional information, may actually include one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections and other components may or may not be shown within the figures, for simplicity of illustration and discussion, and so as not to obscure certain aspects of the embodiments of the invention. Further, arrangements may be shown in processing block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Several features and aspects of embodiments of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

We claim:

1. A target device for sharing a resource, comprising:
   a transceiver;
   at least one processor; and
   at least one memory device, including instructions stored thereon that, when executed by the at least one processor, cause the at least one processor to:
   emit a detection signal from the transceiver;
   receive, in response to the emitted detection signal, a discovery request communication from a source device;
   store the received discovery request communication in the at least one memory device;
   transmit, via the transceiver, a response to the received discovery request communication, the response including information about an identity of the target device;
   receive an information request communication from the source device;
   transmit, via the transceiver, a response to the information request communication, the response to the information request communication including a configuration for the target device;
   receive, in response to transmitting the response to the information request communication, a command from the source device wherein the command invokes an operation to be performed on the target device based on the configuration; and
   execute the command on the target device.

2. The target device of claim 1, wherein the instructions further cause the processor to:
   provide a preference inquiry to a user of the target device pertaining to the operation to be performed on the target device.

3. The target device of claim 2, wherein the instructions further cause the processor to:
   transmit, via the transceiver, a user response to the preference inquiry to the source device.

4. The target device of claim 1, wherein the target device includes an interface to communicate with the target device, a coupled device, or a network to perform an operation.

5. The target device of claim 4, wherein the instructions further cause the processor to:
   transmit, via the transceiver, a result response to the source device, the result response including a result of executing the command.

6. The target device of claim 1, wherein the operation to be performed on the target device is at least one of: an operation for establishing remote access to the target device from the source device, an operation for the target device to run a power-on-self-test, creation of a password or a personal identification number, a firmware update, or a built-in-self-test.

7. The target device of claim 1, wherein the discovery request communication from the source device is a signal from the source device to the target device responsive to the emitted detection signal to detect a presence of the target device.

8. The target device of claim 1, wherein the information about an identity of the target device includes at least one of: a make of the target device, a model number of the target device, a serial number of the target device, an operational status of the target device.

9. The target device of claim 1, wherein the response to the information request communication further includes a technical specification of the target device or a user guide for the target device.

10. The target device of claim 1, wherein the transceiver is a passive radio-frequency identification (RFID) device.

11. A method comprising for proximate communication between a source device and a target device, the method comprising:
    emitting a detection signal from a transceiver coupled to the target device;
    receiving, in response to the emitted detection signal, a discovery request communication from the source device;
    storing the received discovery request communication in at least one memory device included in the target device;
    transmitting, via the transceiver, a response to the received discovery request communication, the response including information about an identity of the target device;
    receiving an information request communication from the source device;
    transmitting, via the transceiver, a response to the information request communication, the response to the information request communication including a configuration for the target device;
    receiving, in response to transmitting the response to the information request communication, a command from the source device wherein the command invokes an operation to be performed on the target device based on the configuration; and
    executing the command on the target device.

12. The method of claim 11, further comprising:
    providing a preference inquiry to a user of the target device pertaining to the operation to be performed on the target device.

13. The method of claim 12, further comprising:
    transmitting, via the transceiver, a user response to the preference inquiry to the source device.

14. The method of claim 11, wherein the target device includes an interface to communicate with the target device, a coupled device, or a network to perform an operation.

15. The method of claim 14, further comprising:
    transmitting, via the transceiver, a result response to the source device, the result response including a result of executing the command.

16. The method of claim 11, wherein the operation to be performed on the target device is at least one of: an operation for establishing remote access to the target device from the source device, an operation for the target device to run a power-on-self-test, creation of a password or a personal identification number, a firmware update, or a built-in-self-test.

17. The method of claim 11, wherein the discovery request communication from the source device is a signal from the source device to the target device responsive to the emitted detection signal to detect a presence of the target device.

18. The method of claim 11, wherein the information about an identity of the target device includes at least one of: a make of the target device, a model number of the target device, a serial number of the target device, an operational status of the target device.

19. The method of claim 11, wherein the response to the information request communication further includes a technical specification of the target device or a user guide for the target device.

20. At least one non-transitory machine-readable medium comprising a set of instructions, which when executed by at least one processor of a target device, cause the at least one processor to perform operations to:
    emit a detection signal from a transceiver coupled to the target device;
    receive, in response to the emitted detection signal, a discovery request communication from a source device;
    store the received discovery request communication in at least one memory device included in the target device;
    transmit, via the transceiver, a response to the received discovery request communication, the response including information about an identity of the target device;
    receive an information request communication from the source device;
    transmit, via the transceiver, a response to the information request communication, the response to the information request communication including a configuration for the target device;
    receive, in response to transmitting the response to the information request communication, a command from the source device wherein the command invokes an operation to be performed on the target device based on the configuration; and
    execute the command on the target device.

21. The at least one non-transitory machine-readable medium of claim 20, wherein the instructions further cause the processor to:
    provide a preference inquiry to a user of the target device pertaining to the operation to be performed on the target device.

22. The at least one non-transitory machine-readable medium of claim 21, wherein the instructions further cause the processor to:
    transmit, via the transceiver, a user response to the preference inquiry to the source device.

23. The at least one non-transitory machine-readable medium of claim 20, wherein the target device includes an interface to communicate with the target device, a coupled device, or a network to perform an operation.

24. The at least one non-transitory machine-readable medium of claim 23, wherein the instructions further cause the processor to:
    transmit, via the transceiver, a result response to the source device, the result response including a result of executing the command.

25. The at least one non-transitory machine-readable medium of claim 20, wherein the operation to be performed on the target device is at least one of: an operation for establishing remote access to the target device from the source device, an operation for the target device to run a power-on-self-test, creation of a password or a personal identification number, a firmware update, or a built-in-self-test.

26. The at least one non-transitory machine-readable medium of claim 20, wherein the discovery request communication from the source device is a signal from the source device to the target device responsive to the emitted detection signal to detect a presence of the target device.

27. The at least one non-transitory machine-readable medium of claim 20, wherein the information about an identity of the target device includes at least one of: a make of the target device, a model number of the target device, a serial number of the target device, an operational status of the target device.

28. The at least one non-transitory machine-readable medium of claim 20, wherein the response to the information request communication further includes a technical specification of the target device or a user guide for the target device.

* * * * *

UNITED STATES PATENT AND TRADEMARK OFFICE
CERTIFICATE OF CORRECTION

PATENT NO. : 11,323,189 B2  
APPLICATION NO. : 17/204178  
DATED : May 3, 2022  
INVENTOR(S) : Prakash et al.

Page 1 of 1

It is certified that error appears in the above-identified patent and that said Letters Patent is hereby corrected as shown below:

On the Title Page

On page 2, in Column 1, under "U.S. Patent Documents", Line 22, delete "2005/0022181" and insert --2005/0221810-- therefor Signed and Sealed this
Thirteenth Day of December, 2022

Katherine Kelly Vidal  
*Director of the United States Patent and Trademark Office*